US009709814B2

(12) United States Patent
Nagahara

(10) Patent No.: US 9,709,814 B2
(45) Date of Patent: Jul. 18, 2017

(54) MULTILAYER DISPLAY APPARATUS

(71) Applicant: Alpine Electronics, Inc., Tokyo (JP)

(72) Inventor: Osamu Nagahara, Tokyo (JP)

(73) Assignee: ALPINE TECHNOLOGY, INC., Tokyo (JP)

(*) Notice: Subject to any disclaimer, the term of this patent is extended or adjusted under 35 U.S.C. 154(b) by 36 days.

(21) Appl. No.: 14/047,618

(22) Filed: Oct. 7, 2013

(65) Prior Publication Data

US 2014/0104682 A1 Apr. 17, 2014

(30) Foreign Application Priority Data

Oct. 16, 2012 (JP) ................................. 2012-229106

(51) Int. Cl.
G02B 27/22 (2006.01)
(52) U.S. Cl.
CPC ......... G02B 27/2214 (2013.01); G02B 27/22 (2013.01); G02B 27/225 (2013.01)
(58) Field of Classification Search
CPC .............. G02B 27/2214; G02B 27/225; G02B 27/0172; G02B 27/0101; G02B 27/01; G02B 27/0093; G02B 27/022; G02B 27/2235; G02B 2027/014; G02B 2027/0141; G02B 2027/0174; G02B 2027/0183; G02B 2027/0196; G02B 3/005; G02B 27/22; H04N 13/0402; H04N 13/0404; H04N 13/0459; H04N 13/00; H04N 2213/006
USPC ......... 359/462, 463, 466, 471, 475, 477, 13, 359/630
See application file for complete search history.

(56) References Cited

U.S. PATENT DOCUMENTS

| 5,589,980 A * | 12/1996 | Bass ................. G02B 27/2292 345/9 |
| 6,061,083 A | 5/2000 | Aritake et al. |
| 2002/0067466 A1 | 6/2002 | Covannon et al. |
| 2002/0118452 A1 | 8/2002 | Taniguchi et al. |

(Continued)

FOREIGN PATENT DOCUMENTS

| JP | 2002-250895 | 9/2002 |
| JP | 2008-015121 | 1/2008 |

(Continued)

OTHER PUBLICATIONS

Notification of Reasons for Refusal for JP 2012-229106 dated May 17, 2016, (8 pgs), including English translation.

(Continued)

Primary Examiner — Scott J Sugarman
Assistant Examiner — Balram Parbadia
(74) Attorney, Agent, or Firm — Brinks Gilson & Lione

(57) ABSTRACT

A multilayer display apparatus included in an in-vehicle system includes a stereoscopic vision display device formed by a 3D display unit and a 3D display control unit that display a three-dimensional image utilizing the principle of binocular disparity, a two-dimensional display device formed by a 2D display unit and a 2D display control unit that display a two-dimensional image on a two-dimensional display face, and a half-silvered mirror. The position of the two-dimensional display face is set within a predetermine range of the position of the screen of the stereoscopic vision display device by using the half-silvered mirror.

18 Claims, 4 Drawing Sheets

(56) References Cited

U.S. PATENT DOCUMENTS

| | | | |
|---|---|---|---|
| 2002/0126396 A1* | 9/2002 | Dolgoff | 359/743 |
| 2005/0040940 A1* | 2/2005 | Sonobe | 340/438 |
| 2006/0204075 A1 | 9/2006 | Mashitani et al. | |
| 2006/0291051 A1* | 12/2006 | Kim | H04N 13/0402 359/462 |
| 2008/0030578 A1* | 2/2008 | Razzaque | A61B 1/0005 348/143 |
| 2008/0291269 A1 | 11/2008 | Hong et al. | |
| 2009/0005961 A1* | 1/2009 | Grabowski | G01C 21/365 701/532 |
| 2010/0157430 A1* | 6/2010 | Hotta | G02B 27/01 359/630 |

FOREIGN PATENT DOCUMENTS

| | | |
|---|---|---|
| JP | 2008-102448 | 5/2008 |
| JP | 2008-293022 | 12/2008 |
| JP | 2011-145351 A | 7/2011 |
| WO | WO 2004-056133 | 7/2004 |
| WO | WO2004/056133 | 7/2004 |

OTHER PUBLICATIONS

Office Action for JP2012-229106 issued Dec. 6, 2016, 9 pgs. Including English translation.

\* cited by examiner

MULTILAYER DISPLAY APPARATUS

PRIORITY CLAIM

This application claims the benefit of Japanese Patent Application No. 2012-229106 filed on Oct. 16, 2012, and which is incorporated by reference herein in its entirety.

BACKGROUND

1. Field of the Invention

The present invention relates to a multilayer display apparatus configured to display stereoscopic vision images utilizing binocular disparity techniques.

2. Description of the Related Art

To date, a multi-viewpoint stereoscopic display apparatus is known that includes a plurality of display devices for providing multilayered background edges on faces other than a stereoscopic vision display face. In such a multi-viewpoint stereoscopic display apparatus, a feeling of space is obtained by a stereoscopic vision display device, and a video image having a high spatial frequency around an edge portion is subjected to a multilayer display by matching the convergence and accommodation position with a focal position (see, for example, Japanese Unexamined Patent Application Publication No. 2008-15121). The use of the multi-layered background edges makes it possible to resolve a mismatch between convergence and accommodation.

SUMMARY

In the multi-viewpoint stereoscopic display apparatus disclosed in the Japanese Unexamined Patent Application Publication No. 2008-15121, a layered background edge is displayed so as to be superimposed on a multi-viewpoint image in order to resolve the mismatch between convergence and accommodation. Thus, the time it takes to achieve stereoscopic vision can be reduced, and so-called 3D sickness or motion-like sickness, experienced by the viewer, can be reduced. However, a focusing system array or a large-aperture focusing system needs to be provided between the display face and a viewer, and thus the apparatus is disadvantageously complex.

Some embodiments of the present invention has been made in view of such an issue, and it is an object of the present invention to provide a multilayer display apparatus that can reduce the time it takes to achieve stereoscopic vision and can reduce 3D sickness of the viewer with a simple configuration.

To solve the above-described issue, a multilayer display apparatus according to some embodiments of the present invention includes a stereoscopic vision display device configured to display a three-dimensional image utilizing the principle of binocular disparity and a two-dimensional display device configured to display a two-dimensional image on a two-dimensional display face. In the stated multilayer display apparatus, the position of the two-dimensional display face is set within a predetermine range of the position of the screen of the stereoscopic vision display device. In particular, it is preferable that this predetermined range coincide with a position of the screen or be in the vicinity of the position of the screen of the stereoscopic vision display device.

A simple configuration in which the two-dimensional display face is simply arranged within a predetermined range of the screen of the stereoscopic vision display device (specifically, coinciding with the position of the screen or in the vicinity of the position of the screen of the stereoscopic vision display device) allows a user to immediately determine a fixation point in the stereoscopic vision display device. Accordingly, the orientation of the stereoscopic vision is stabilized while preventing an angle of convergence or a focal point from fluctuating, and a situation in which the user cannot accommodate properly due to a mismatch between convergence and accommodation can be prevented. Thus, the time it takes to achieve stereoscopic vision can be reduced, and 3D sickness can also be reduced.

Further, it is preferable that the aforementioned two-dimensional image be a visually useful and attractive image. Specifically, it is preferable that the screen of the stereoscopic vision display device and the two-dimensional display face be arranged in front of a driver's seat of a vehicle and that the visually useful and attractive image be an image representing an instrument associated with driving the vehicle. Here, it is preferable that the stated instrument be at least one of a speedometer and a tachometer. In addition, it is preferable that the aforementioned visually attractive image be at least one of an image with higher luminance, an image with higher contrast, an image with higher color saturation, an image with a more prominent hue, and a more dynamic image compared to the three-dimensional image. Such an image gives a visually strong impression on the user and thus is suitable as a fixation point in the stereoscopic vision display device. Thus, the time it takes to achieve stereoscopic vision can be further reduced.

Furthermore, it is preferable that the aforementioned stereoscopic vision display device be configured to display the three-dimensional image through a parallax barrier method or a lenticular method. Using such a technique in the stereoscopic vision display device makes it possible to further simplify the configuration thereof.

It is preferable that the multilayer display device further include a half-silvered mirror arranged between the screen of the stereoscopic vision display device and the user's eyes so as to be inclined relative to the line of sight of the user and that a virtual image formed in the two-dimensional display device using the half-silvered mirror be used as the two-dimensional image. Specifically, it is preferable that the virtual image be superimposed on the screen of the aforementioned stereoscopic vision display device. Generating the two-dimensional image using the virtual image formed through the half-silvered mirror makes it possible to dispose the two-dimensional display device at a position spaced apart from the stereoscopic vision display device, and thus the details of the multilayer display apparatus can be prevented from becoming complex.

Furthermore, it is preferable that at least part of the three-dimensional image be displayed on the screen of the aforementioned stereoscopic vision display device in a region other than a region where the two-dimensional image is displayed. Through such a configuration, a display region in the stereoscopic vision display device can be secured, and a fixation point in the stereoscopic vision display device can be determined with ease.

DETAILED DESCRIPTION

Figure 1:
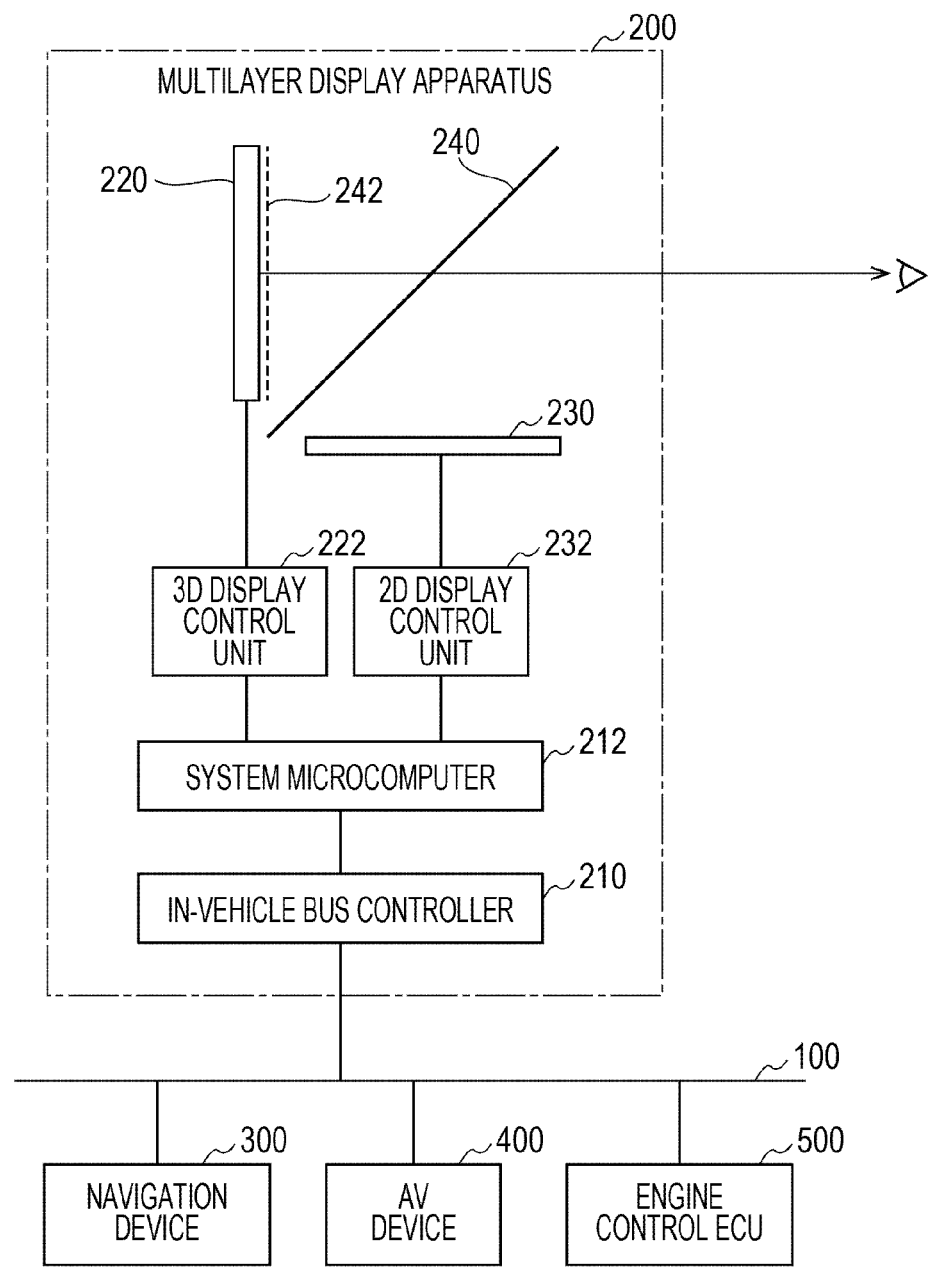
FIG. 1 illustrates a configuration of an in-vehicle system according to an embodiment.

Hereinafter, an in-vehicle system of an embodiment to which the present invention is applied will be described with reference to the drawings. FIG. 1 illustrates a configuration of the in-vehicle system of the embodiment. As illustrated in FIG. 1, the in-vehicle system of the present embodiment includes a multilayer display apparatus 200, a navigation device 300, an audiovisual (AV) device 400, and an engine control ECU (electronic control unit) 500, which are interconnected through an in-vehicle bus 100. The in-vehicle bus 100, for example, transmits and receives signals in accordance with a controller area network (CAN) protocol. Note that an in-vehicle bus that is compatible with a protocol other than the CAN protocol may instead be used.

The multilayer display apparatus 200 displays various pieces of information that are necessary while driving on a display unit disposed in front of the driver's seat of the vehicle. The multilayer display apparatus 200 includes an in-vehicle bus controller 210, a system microcomputer 212 or processor, a 3D display unit 220, a 3D display control unit 222, a 2D display unit 230, a 2D display control unit 232, and a half-silvered mirror 240. Any suitable processing component may be used as the processor.

The in-vehicle bus controller 210 is connected to the in-vehicle bus 100 and controls input/output of a physical signal in accordance with the CAN protocol. The system microcomputer 212 controls the entire multilayer display apparatus 200 and controls input/output of various pieces of display data among the navigation device 300, the AV device 400, and the engine control ECU 500 through the in-vehicle bus controller 210 and the in-vehicle bus 100.

The 3D display unit 220 displays a three-dimensional (3D) image utilizing the principle of binocular disparity (parallax division method of line of sight), and the 3D display unit 220 and the 3D display control unit 222 that drives the 3D display unit 220 collectively constitute a stereoscopic vision display device. The specific configuration of the 3D display unit 220 differs depending on the method to be employed. For example, if a parallax barrier method is to be employed to realize three-dimensional image display, two images are each cut into vertically elongated pieces, and the cut pieces are arranged such that the pieces from the respective images appear alternately. Then, a shading barrier having vertically elongated apertures is disposed in front of the cut pieces of the images. Alternatively, if a lenticular method (lenticular lens method) is to be employed to realize three-dimensional image display, cylindrical lenses are used in place of the above-described shading barrier.

The 2D display unit 230 displays a two-dimensional (2D) image, and the 2D display unit 230 and the 2D display control unit 232 that drives the 2D display unit 230 collectively constitute a two-dimensional display device. The specific configuration of the 2D display unit 230 differs depending on the type of display device to be employed. For example, if a liquid crystal display (LCD) is used to realize two-dimensional image display, a liquid crystal panel is used as the 2D display unit 230, and an LCD control unit is used as the 2D display control unit 232 for driving the liquid crystal panel. Alternatively, if a light-emitting diode (LED) is used to realize two-dimensional image display, LEDs are used for the 2D display unit 230, and an LED driver is used as the 2D display control unit 232 for driving the LEDs.

The half-silvered mirror 240 is arranged between the screen of the 3D display unit 220 and the user's eyes so as to be inclined relative to the line of sight of the user. The 2D display unit 230 is disposed below the half-silvered mirror 240. Adjusting the position and the angle of the half-silvered mirror 240 appropriately in this way allows a virtual image 242 on the screen of the 2D display unit 230 to be used as a two-dimensional image and this virtual image 242 to be contained within a predetermined range of the screen position of the 3D display unit 220. (Here, the predetermined range specifically spans from the screen position to the vicinity thereof, for example, within a range of a few centimeters or less from the screen position of the 3D display unit 220.)

The navigation device 300 detects the position of the vehicle in which the navigation device 300 is mounted (hereinafter, the vehicle) using a GPS device, a gyro sensor, a vehicle speed sensor, and the like (not illustrated), and carries out a navigation operation to navigate the vehicle equipped with the in-vehicle system using map data. The map data may be stored in a hard disk device or a semiconductor memory included in the navigation device 300 or may be acquired by connecting to a map distribution server through the Internet. In addition, the navigation device 300 generates, as part of the navigation operation, a three-dimensional image of a map around the area where the vehicle is located. This three-dimensional image is transmitted to the multilayer display apparatus 200 through the in-vehicle bus 100 and is displayed on the screen of the 3D display unit 220 under the control of the 3D display control unit 222.

The AV device 400 plays back various contents including music and a video image. For example, the AV device 400 may read out and play back contents of a CD or a DVD, may read out and play back compressed audio data or compressed video image data stored in a semiconductor memory, may play back content data acquired by connecting to a content distribution server through the Internet, and so on. The AV device 400 does not need to play back contents including music and a video image and may instead only play back music content. Furthermore, in addition to the AV device 400, or in place of the AV device 400, a TV tuner or a radio tuner may be used to receive and play back a broadcast signal.

The engine control ECU 500 controls the engine (not illustrated) in accordance with a state of the gas pedal, a state of a driving load of the vehicle, and so on. In addition, the engine control ECU 500 outputs pieces of data indicative of an engine speed and a traveling speed of the vehicle. These pieces of data are then transmitted to the multilayer display apparatus 200 through the in-vehicle bus 100. In the present embodiment, images respectively representing a speedometer and an engine tachometer to be displayed while the vehicle is traveling are displayed on the 2D display unit 230 of the multilayer display apparatus 200. Upon receiving the pieces of data indicating the engine speed and the traveling speed of the vehicle transmitted from the engine control ECU 500, the system microcomputer 212 generates the images representing the speedometer and the engine tachometer on the basis of the received pieces of data. Then, these images are displayed on the screen of the 2D display unit 230 under the control of the 2D display control unit 232.

The in-vehicle system of the present embodiment has the configuration as described above. Hereinafter, characteristics of a two-dimensional image to be displayed on the 2D display unit 230 of the multilayer display apparatus 200 will be described. Desirable characteristics of the two-dimensional image are as follows.

(1) The two-dimensional image is a visually attractive image.
(2) If the 3D display unit 220 and the 2D display unit 230 of the multilayer display apparatus 200 are located in front of the driver's seat of the vehicle (the present embodiment applies to this case), the visually attractive image is preferably an image representing an instrument necessary for driving the vehicle. Specifically, as mentioned above, the instrument preferably includes a speedometer and a tachometer (alternatively, may be at least one of the speedometer and the tachometer, or an odometer may be substituted in place of the speedometer or tachometer).
(3) The visually attractive image is at least one of an image with higher luminance, an image with higher contrast, an image with higher color saturation, an image with a more prominent hue, and a more dynamic image compared to the three-dimensional image.

Figure 2:
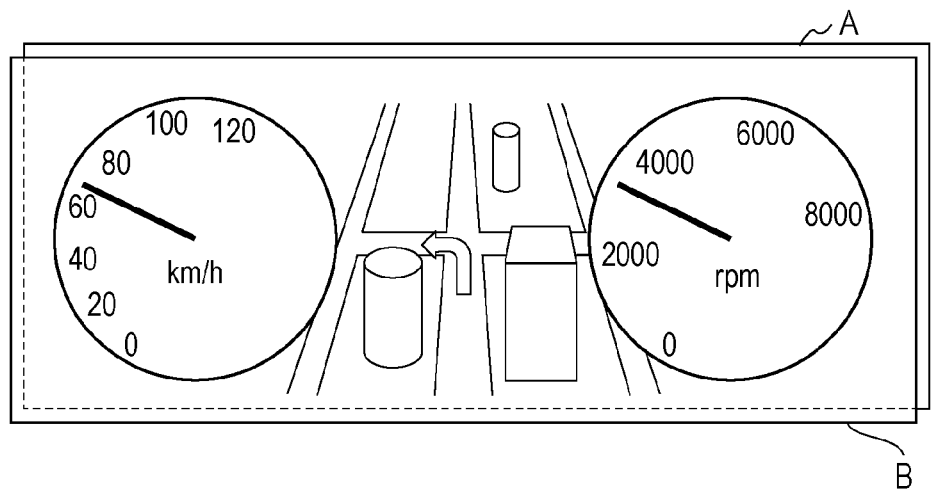
FIG. 2 is a diagram illustrating a specific example of a display screen of a multilayer display apparatus.
Figure 3:
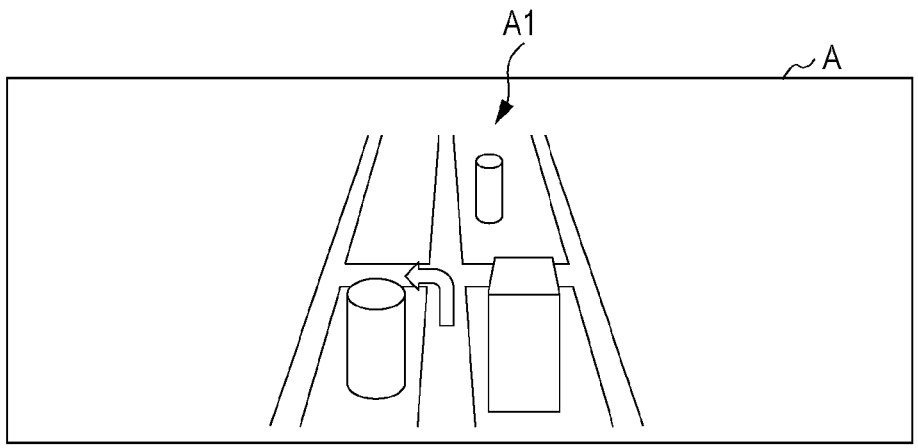
FIG. 3 is another diagram illustrating the specific example of the display screen of the multilayer display apparatus.
Figure 4:
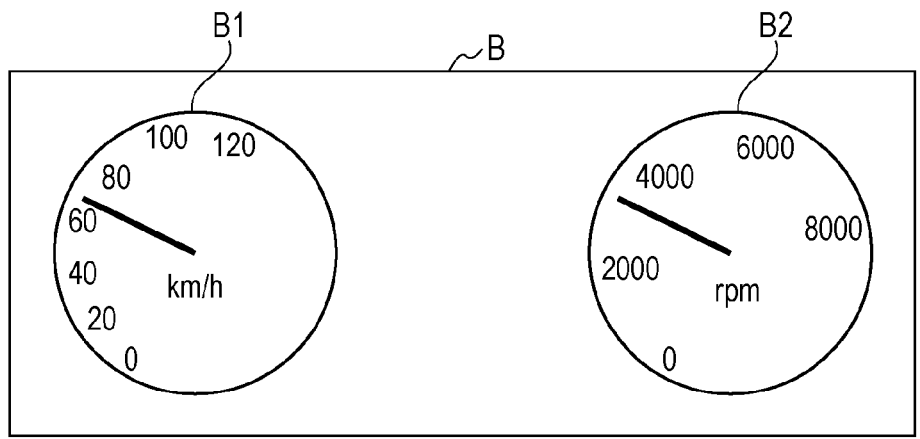
FIG. 4 is yet another diagram illustrating the specific example of the display screen of the multilayer display apparatus.

FIG. 2 is a diagram illustrating a specific example of the display screen of the multilayer display apparatus 200. FIG. 2 illustrates a range A of the screen of the 3D display unit 220 and a range B of the virtual image 242 on the screen of the 2D display unit 230. FIG. 3 illustrates the range A alone, and FIG. 4 illustrates the range B alone. In addition, FIG. 3 illustrates a three-dimensional image A1 displayed on the 3D display unit 220, and FIG. 4 illustrates two-dimensional images B1 and B2 included in the virtual image 242. In the present embodiment, the three-dimensional image of the map around the area where the vehicle is located generated by the navigation device 300 serves as the three-dimensional image A1. In addition, the two-dimensional images of the speedometer and the engine tachometer generated by the system microcomputer 212 on the basis of the pieces of data acquired from the engine control ECU 500 serve as the two-dimensional images B1 and B2. It is to be noted that although the range A and the range B are illustrated so as to be somewhat offset from each other in FIG. 2, these ranges A and B actually coincide with each other.

Further, in the present embodiment, the range B of the virtual image 242 on the screen of the 2D display unit 230 is superimposed on the range A (see FIG. 3) that is the screen of the 3D display unit 220. In addition, the three-dimensional image A1 (or part of the three-dimensional image A1) is displayed in a region within the range B where the two-dimensional images B1 and B2 are not displayed (i.e., a region between the two-dimensional images B1 and B2 in the example illustrated in FIG. 4). Through this configuration, a display region for the three-dimensional image A1 can be secured, and a fixation point in the stereoscopic vision display device formed by the 3D display unit 220 and the 3D display control unit 222 can be determined with ease.

In this way, with the multilayer display apparatus 200 of the present embodiment, a simple configuration in which the screen (virtual image) of the 2D display unit 230 is arranged within a predetermined range of the screen of the 3D display unit 220 (specifically, coinciding with the position of the screen or in the vicinity of the position of the screen of the 3D display unit 220) allows the user to immediately determine a fixation point in the 3D display unit 220. Accordingly, the orientation of the stereoscopic vision is stabilized while preventing an angle of convergence or a focal point from fluctuating, and a situation in which the user cannot accommodate properly due to the mismatch between convergence and accommodation can be prevented. Thus, the time it takes to achieve stereoscopic vision can be reduced, and 3D motion-like sickness experienced by the viewer can also be reduced.

In addition, as a visually attractive image that gives a visually strong impression to the user is used as the two-dimensional image, the two-dimensional image can be used as the fixation point in the stereoscopic vision display device, which can further reduce the time it takes to achieve stereoscopic vision.

The stereoscopic vision display device formed by the 3D display unit 220 and the 3D display control unit 222 displays a three-dimensional image through a parallax barrier method or a lenticular method, and employing such a widely used technique makes it possible to further simplify the configuration.

Furthermore, generating a two-dimensional image using a virtual image formed through the half-silvered mirror 240 makes it possible to dispose the two-dimensional display unit 230 at a position spaced apart from the 3D display unit 220, and thus the details of the multilayer display apparatus 200 can be prevented from becoming complex.

Figure 5:
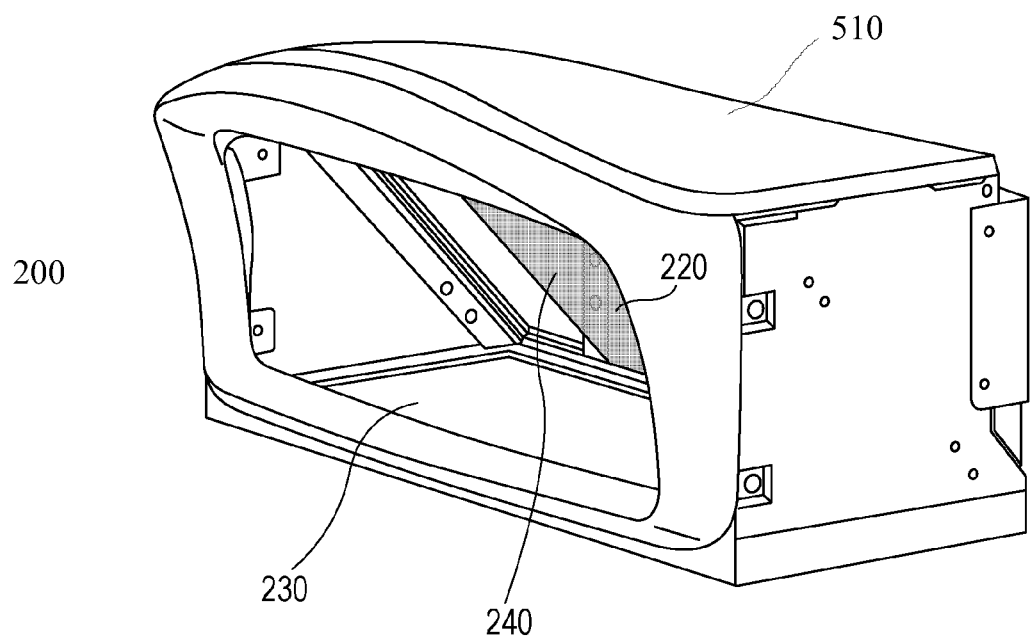
FIG. 5 is a perspective view of a specific embodiment of the multilayer display apparatus.

FIG. 5 shows a perspective pictorial view of the multilayer display apparatus 200 particularly showing the 3D unit 220, the 2D unit 230, and the half-silvered mirror 240 in relative position to each other within an enclosure 510. The enclosure 510 may be recessed into an aperture in the dashboard of the vehicle or may be placed external to the dashboard.

Figure 6:
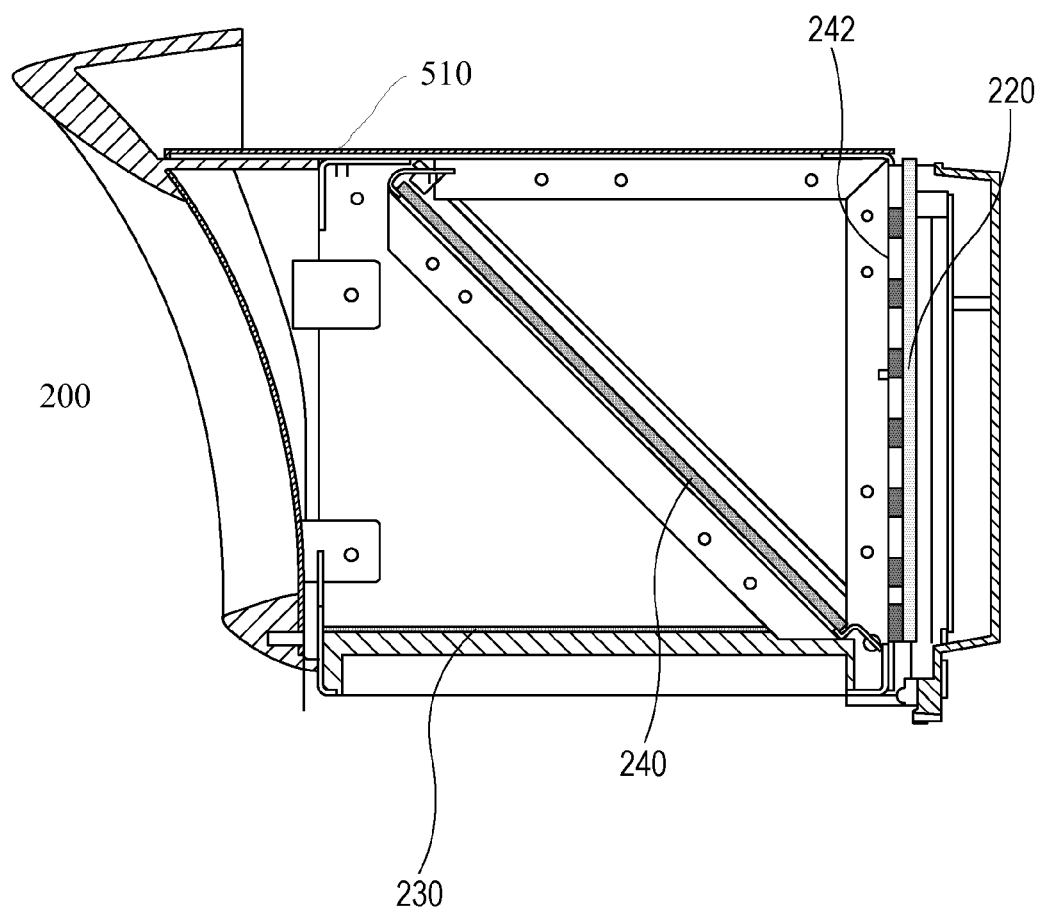
FIG. 6 is a top plan view of a specific embodiment of the multilayer display apparatus.

FIG. 6 shows a top plan view of the multilayer display apparatus 200 particularly showing the 3D unit 220, the 2D unit 230, and the half-silvered mirror 240 in relative position to each other within an enclosure 510. The enclosure 510 may be recessed into an aperture in the dashboard of the vehicle or may be placed external to the dashboard.

It is to be noted that the present invention is not limited to the above-described embodiment, and various modifications can be made within the scope of the present invention. For example, although the three-dimensional image of the map around the area where the vehicle is located is used as the three-dimensional image A1 and the two-dimensional images of the speedometer and the engine tachometer are used as the two-dimensional images B1 and B2 in the embodiment described above, images other than the stated images may be combined. For example, an operation screen generated by the AV device 400 may be used as the three-dimensional image A1. Further, irrespective of whether it is necessary for driving the vehicle, an image with higher luminance, an image with higher contrast, an image with higher color saturation, an image with a more prominent hue, and a more dynamic image compared to the three-dimensional image may be used as the two-dimensional images B1 and B2 (here, either one may be omitted).

Furthermore, although the present invention is applied to the multilayer display apparatus included in the in-vehicle system in the embodiment described above, the present invention can be applied to any other systems in which a two-dimensional image and a three-dimensional image generated utilizing the principle of binocular disparity are combined. For example, the present invention can be applied to a home-use video image playback system that plays back a three-dimensional image such as a movie.

As described thus far, according to the present invention, a simple configuration in which the two-dimensional display face is arranged within a predetermined range of the screen of the stereoscopic vision display device allows the user to immediately determine a fixation point in the stereoscopic vision display device. Accordingly, the orientation of the stereoscopic vision is stabilized while preventing an angle of convergence or a focal point from fluctuating, and a situation in which the user cannot accommodate properly due to the mismatch between convergence and accommodation can be prevented. Thus, the time it takes to achieve stereoscopic vision can be reduced, and 3D sickness can also be reduced.

Although preferred embodiments have been described in detail, the present invention is not limited to these specific embodiments. Rather, various modifications and changes can be made without departing from the scope of the present invention as described in the accompanying claims. Accordingly, all such modifications are intended to be included within the scope of this invention as defined in the following claims.

What is claimed is:

1. A multilayer display apparatus, comprising:
an electronic stereoscopic vision display device having a 3D (three-dimensional) viewable display face, the display device configured to display a three-dimensional image based on binocular disparity;
a two-dimensional display device configured to display a two-dimensional image;
wherein a position of the two-dimensional image is set within a predetermined range in a foreground of a position of the 3D viewable display face of the stereoscopic vision display device; and
wherein the predetermined range is in a vicinity of an area of the 3D viewable display face.

2. The multilayer display apparatus according to claim 1, wherein the two-dimensional image is a visually attractive image.

3. The multilayer display apparatus according to claim 2, wherein the visually attractive image is at least one of an image with higher luminance, an image with higher contrast, an image with higher color saturation, an image with a more prominent hue, and a more dynamic image, respectively, relative to the three-dimensional image.

4. The multilayer display apparatus according to claim 3, wherein the 3D viewable display face and two-dimensional display device are arranged in front of a driver's seat of a vehicle; and
wherein the visually attractive image corresponds to an instrument associated with driving the vehicle.

5. The multilayer display apparatus according to claim 4, wherein the instrument is at least one of a speedometer, an odometer, and a tachometer.

6. The multilayer display apparatus according to claim 1, wherein the stereoscopic vision display device is configured to display the three-dimensional image using a parallax barrier or a lenticular component.

7. The multilayer display apparatus according to claim 1, further comprising:
a half-silvered mirror arranged between the 3D viewable display face and a user's eyes so as to be inclined relative to a line of sight of the user; and
wherein a virtual image from the two-dimensional display device is formed using a surface of the half-silvered mirror as the two-dimensional image.

8. The multilayer display apparatus according to claim 7, wherein the virtual image is superimposed on the 3D viewable display face.

9. The multilayer display apparatus according to claim 8, wherein at least part of the three-dimensional image is displayed on the 3D viewable display face in a region other than a region where the two-dimensional image is displayed.

10. A multilayer display apparatus, comprising:
an electronic stereoscopic vision display device having a 3D (three-dimensional) viewable display face, configured to display a three-dimensional image on the 3D viewable display face based on binocular disparity;
a two-dimensional display device having a 2D (two-dimensional) viewable display face, the two-dimensional display device configured to display a two-dimensional image;
a half-silvered mirror disposed between the 2D viewable display face and the 3D viewable display face;
wherein a position of the two-dimensional image is set within a predetermined range in a foreground of a position of the 3D viewable display face of the stereoscopic vision display device; and
wherein the predetermined range is in a vicinity of an area of the 3D viewable display face.

11. The multilayer display apparatus according to claim 10, wherein the two-dimensional image is a visually attractive image.

12. The multilayer display apparatus according to claim 11, wherein the visually attractive image is at least one of an image with higher luminance, an image with higher contrast, an image with higher color saturation, an image with a more prominent hue, and a more dynamic image, respectively, relative to the three-dimensional image.

13. The multilayer display apparatus according to claim 12, wherein the 3D viewable display face and the 2D viewable display face are arranged in front of a driver's seat of a vehicle; and
wherein the visually attractive image corresponds to an instrument associated with driving the vehicle.

14. The multilayer display apparatus according to claim 13, wherein the instrument is at least one of a speedometer, an odometer, and a tachometer.

15. The multilayer display apparatus according to claim 10, wherein the stereoscopic vision display device is configured to display the three-dimensional image using a parallax barrier or a lenticular component.

16. The multilayer display apparatus according to claim 10, wherein:
the half-silvered mirror is arranged between the 3D viewable display face and a user's eyes so as to be inclined relative to a line of sight of the user; and
wherein a virtual image from the two-dimensional display device is formed using a surface of the half-silvered mirror as the two-dimensional image.

17. The multilayer display apparatus according to claim 16, wherein the virtual image is superimposed on the 3D viewable display face.

18. The multilayer display apparatus according to claim 17, wherein at least part of the three-dimensional image is displayed on the 3D viewable display face in a region other than a region where the two-dimensional image is displayed.

* * * * *